Aug. 22, 1944.    R. E. MARTIN    2,356,467
GRAMOPHONE PICKUP ARM
Filed April 9, 1943

Inventor
R. E. Martin
By George G. Hyde
Attorney

Patented Aug. 22, 1944

2,356,467

UNITED STATES PATENT OFFICE 2,356,467

GRAMOPHONE PICKUP ARM

Robert Edgar Martin, South Devon, England, assignor to International Standard Electric Corporation, New York, N. Y.

Application April 9, 1943, Serial No. 482,424
In Great Britain December 2, 1941

8 Claims. (Cl. 179—100.41)

This invention relates to pick-up arms for radio gramophones and other electrical reproducing machines.

According to the present invention the pick-up arm is provided with a movable counter weight whereby the arm remains in the raised position for needle-changing purposes or when tilted to the playing position is maintained on the record with the requisite pressure.

According to another feature of the invention the movable counter weight is arranged to operate an electric switch so that when the pick-up is off the record it is effectively muted so that the needle can be changed without producing unpleasant scraping sounds in the loudspeaker.

Preferably according to the invention the pick-up arm consists of a tube pivoted at an intermediate point, and the movable counter weight takes the form of a small quantity of mercury in the tube which is sufficient to counter-balance the weight of the pick-up. The mercury may also be arranged with an auxiliary contact in the tube to provide a mercury switch to short-circuit the pick-up when it is in the raised position.

Reference is made to the accompanying diagrammatic drawing which illustrates one specific embodiment of the invention and in which.

Figure 1:
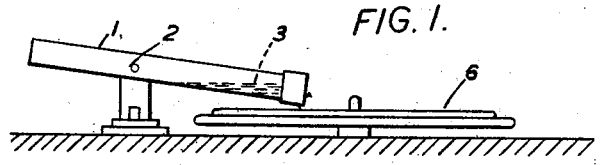
Fig. 1 is a diagram showing the pick-up arm in playing position.
Figure 2:
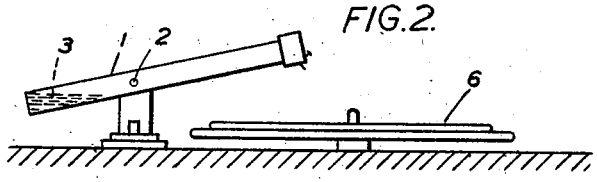
Fig. 2 is a diagram showing the pick-up arm in raised position.
Figure 3:
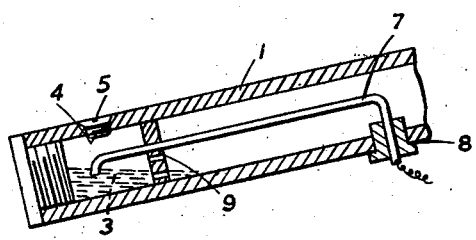
Fig. 3 is a sectional detail of the rear end of the pick-up arm showing the mercury switch.

The pick-up arm is made in the form of a hollow tube 1 sealed up at both ends. The tube is pivotally supported at an intermediate point along its length and it is arranged to balance on its pivot 2, a small quantity of mercury 3 then being introduced into the tube through a small hole 4, which is then sealed up with a plug 5 (Fig. 3). The quantity of mercury is just sufficient to weight the needle correctly on to the record 6, and the arm with its pivot is so designed that is slopes gently towards the record when playing, thus causing the mercury to flow to the pick-up end of the tube thereby holding it down as shown in Fig. 1. When the record is finished, the pick-up is lifted slightly and the mercury flows back to the counterbalance end of the tube, the weight of the mercury being sufficient to hold the pick-up off the record in a suitable position for needle changing as shown in Fig. 2.

Figure 4:
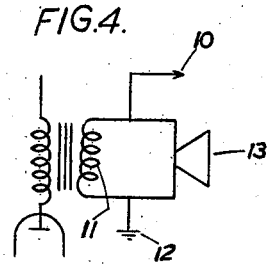
Fig. 4 is a circuit diagram showing a portion of the final stage of an amplifier and loudspeaker of a radiogram showing a suitable connection for the mercury switch.

Contacts are introduced into the tube so that when the pick-up is off the record the mercury operates the contact to mute the pick-up, thereby cutting out the unpleasant scraping sounds in the loudspeaker which usually occur when the needle is being changed. A convenient construction of mercury switch (shown in Fig. 3) is provided by introducing a wire 7 through an insulating bush 8 in the tube 1 and extending towards the counter-balance end thereof, this wire being supported in a perforated Bakelite washer 9 situated in the tube. The tube 1 being of metal and earthed, the wire 7 may be connected at 10 to one side of the speech coil 11 of the amplifier circuit as shown in Fig. 4, the other side of the coil being earthed at 12, and thus when the pick-up is raised and the mercury flows to the counter-balance end the tube, it makes electrical connection between the wire and the tube and thereby effectively short-circuits the speech coil 11 and the loudspeaker 13.

Obviously the invention is not confined to the precise details herein described, which are given by way of example only of one particular embodiment thereof.

What is claimed is:

1. In combination a pick-up arm for an electrical sound translating device, a pivot for said arm located intermediate its ends, and a floating weight for holding either end of said arm depressed when it is tilted either into its playing or non-playing position.

2. Electrical sound translating apparatus comprising a pick-up arm, a pivot for said arm intermediate its ends, an electrical sound translating device mounted at one end of said arm, and a floating weight for holding said electical sound translating device in either its raised position for needle changing purposes or in its lowered position for playing.

3. Electrical sound translating apparatus comprising a pick-up arm, a record table, a pivot for said arm intermediate its ends, an electrical sound translating device mounted at one end of said arm, and a floating weight for holding said electrical sound translating device in either its raised position for needle changing purposes or in its lowered position for playing on said record table with a predetermined pressure.

4. Electrical sound translating apparatus comprising a pick-up arm, a pivot for said arm intermediate its ends, an electrical sound translating device mounted at one end of said arm, an electric switch mounted on said arm, and a floating weight for actuating said switch when said arm is tilted about its pivot and for holding said arm in either or its two stable positions of tilt.

5. In an electrical sound translating apparatus a pick-up arm including a tubular member having a closure at each end, a pivot for said arm located intermediate its ends, and a floating globule of mercury in said tubular member.

6. Electrical sound translating apparatus comprising a pick-up arm including a tubular member having a closure at each end, a pivot for said arm located intermediate its ends, an electrical sound translating device mounted at one end of said tubular member, and a floating globule of mercury in said tubular member free to run to either end thereof so as to hold said sound translating device in its raised position for needle changing purposes or in its lowered position for playing.

7. Electrical sound translating apparatus comprising a pick-up arm including a tubular member having a closure at each end, a pivot for said arm located intermediate its ends, an electrical sound translating device mounted at one end of said tubular member, electric switch means mounted on said tubular member, and a floating globule of mercury in said tubular member for maintaining said pick-up arm in either of two stable positions of tilt and in one of said positions for short-crcuiting said switch means.

8. Electrical sound translating apparatus according to claim 4, wherein said pick-up arm comprises a tube closed at both ends and said floating weight comprises a quantity of mercury which runs in said tube.

ROBERT EDGAR MARTIN.